Feb. 2, 1943. T. S. MILLER 2,309,658
PACKING DEVICE
Filed June 6, 1939
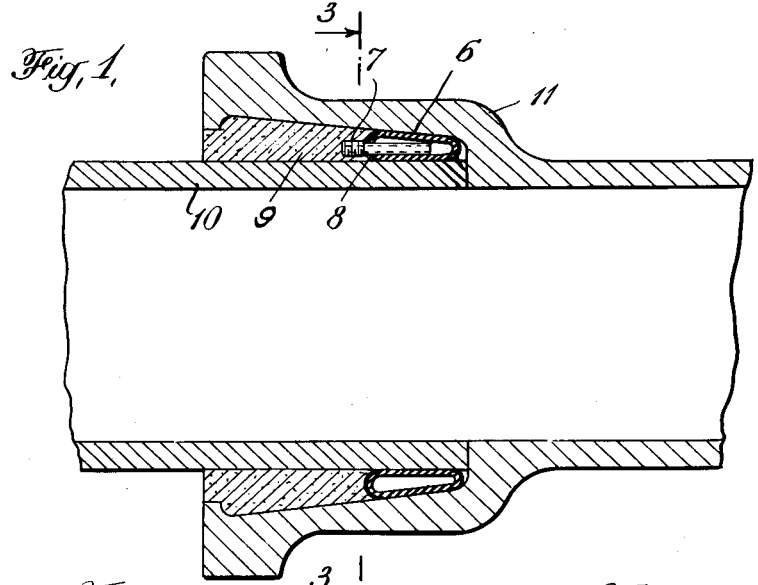
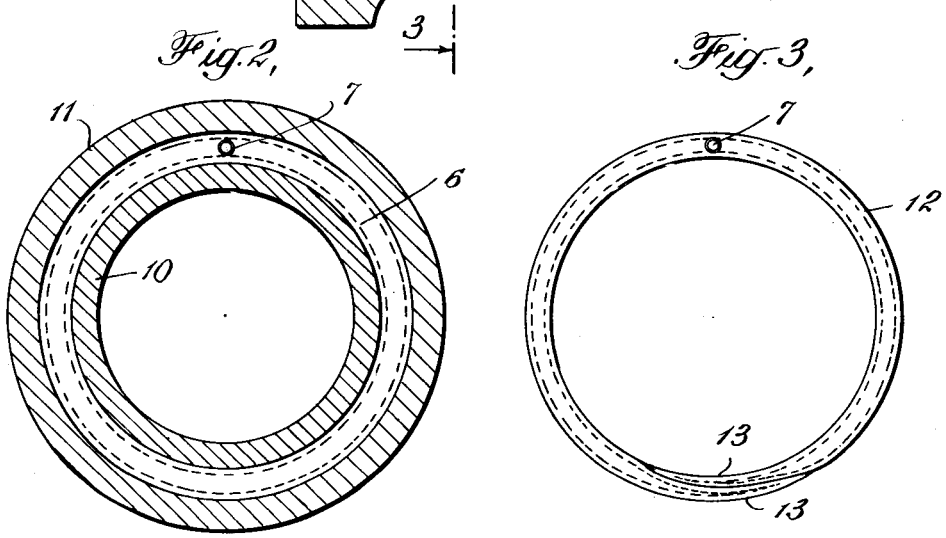
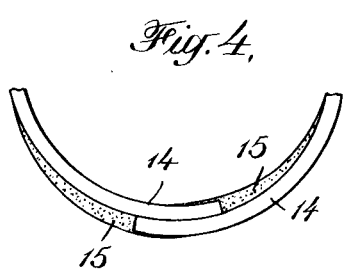
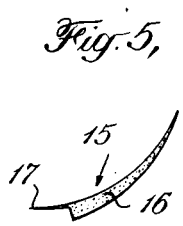
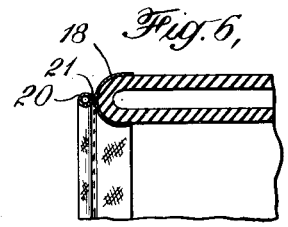
INVENTOR
THOMAS S. MILLER
BY
Pennie, Davis, Marvin and Edmonds
ATTORNEYS Patented Feb. 2, 1943

2,309,658

UNITED STATES PATENT OFFICE 2,309,658

PACKING DEVICE

Thomas S. Miller, Rome, N. Y., assignor to Water & Sewer Equipment Corporation, Rome, N. Y., a corporation of New York Application June 6, 1939, Serial No. 277,600

10 Claims. (Cl. 285—115)

This invention relates to packing devices for fluid delivery conduits and, more particularly, to bone-dry packing devices for water mains, and the like. The invention includes improved packing devices as well as an improved method of permanently sealing water mains.

In the installation of extensions for municipal water mains, and in the repair of existing water mains, it is necessary permanently to seal the sections of pipe comprising the water main system. Fusible materials such, for example, as lead and similar substances of synthetic nature are used to obtain this permanent sealing. When it is desired to install an extension of an existing water main or to repair an existing system the valves in that system must be closed during operations. However, it is characteristic of these valves that they will not completely stop the flow of water so that there is a constant flow of water, even though it may be only a trickle, into the line under construction or repair. The presence of this flow of water creates not only a serious hazard but also a mechanical obstacle. Molten lead can not be poured into the joint between the cylindrical end of one pipe section and the bell-shaped overlapping end of an adjoining pipe if any moisture is present within this joint because the steam generated by the molten lead produces an explosion which blows the molten mass back onto the workmen. Furthermore, fusible materials other than lead require an absolutely bone-dry surface if a water-tight joint is to be obtained, and when the surfaces of the pipes comprising this joint are wet or even moist the resulting seal, after hardening, is imperfect and must be removed at the expense of considerable time and labor. It has been conventional practice heretofore to prevent the entry of water into such a joint by packing the innermost portion of the joint with calking, but this method requires extreme care and excessive labor in order to obtain and maintain the surfaces of the joint absolutely dry.

I have devised a bone-dry packing device which insures complete freedom from moisture within the joints of water mains and which greatly reduces the hazards and time consumed in sealing pipes with fusible materials. This device comprises an annular inflatable ring adapted to encircle the cylindrical end of one pipe section within the bell-shaped mouth of an adjoining section, the inflatable ring being provided with an inflating valve mounted on one edge of the ring to project outwardly toward the open end of the joint and, preferably, having this same edge covered with a protective material adapted to prevent injury to the ring occasioned by the fused sealing material. This sealing device lends itself to a method of sealing sections of water mains whereby only about twenty minutes are required to seal a section which, in conventional practice heretofore, has required several hours for the sealing operation.

The novel packing device of my invention will be more fully understood upon reference to the drawing in which:

Fig. 1 comprises a sectional view showing the position and details of an annular inflatable ring of my invention positioned within the joint of adjoining sections of a water main;

Fig. 2 is a section taken along line 3—3 in Fig. 1;

Fig. 3 comprises an end view of a modified form of my novel device of the split-ring type and adapted to be used in the repair of existing water mains;

Fig. 4 is a partial view of the overlapping ends of another modified type of split-ring packing device;

Fig. 5 is an end view of inserts adapted to complement the contour of the split-ring device shown in Fig. 3; and Fig. 6 is a sectional view of a further modification of the ring shown in Fig. 1.

The novel packing device of my invention shown in Figs. 1 and 2 comprises an annular rubber inflatable ring 6 of substantially greater width than thickness in its deflated form and provided with a suitable valve 7 adapted for inflation of the ring positioned in one edge of the ring. This edge of the inflatable ring is further provided with a protective covering 8 of suitable material such, for example, as canvas or the like. The inflatable ring is of such sufficient diameter to fit around the cylindrical surface of one end of a water main section 10 and is sufficiently flat to permit its insertion within the space provided by this end of section 10 and the bell-shaped end 11 of an adjoining water main section.

The inflatable rings shown in Figs. 3 and 4 are adapted for use in repairing existing water mains. Both of these rings are of the split-ring type. The inflatable ring 12 shown in Fig. 3 is provided with an inflation valve 7, and the ends of the ring terminate in tapered portions 13, suitably sealed as by vulcanization, so that these ends overlap to form a ring having substantially smooth circular surfaces. The overlapping sealed ends 14 of the split-type inflatable ring shown in Fig. 4 are of simpler construction and terminate abruptly. Inserts 15, shown in detail in Fig. 5, constructed with advantage of rubber or similar flexible material, are provided for complementing the contour of the ring adjacent the overlapping ends thereof in order to provide substantially smooth circular surfaces on both exterior surfaces of the rings. These inserts comprise a main body portion 16 adapted to abut the flat end of one overlapping portion of the ring with a relatively thin fin 17 adapted to rest upon or overlap this end portion of the ring so as to provide a continuous surface which covers the abruptly terminating ends of the ring. The length of the inserts 15 is substantially the same as the width of the inflatable ring with which they are to be used.

The modification of my device shown in Fig. 6 resides in the construction of the protective covering 18, made of canvas or equivalent material, disposed on the same lateral edge of the ring as the valve. This covering is provided with a slight excess of material adjacent the center outer portion of the edge of the ring so as to form a loop 20 when the material is sewn or otherwise bound together as indicated at 21. A wire or cord is inserted in this loop which extends substantially the entire circumference of the ring adjacent the edge thereof, and the ends of the wire or cord are drawn out of the loop at a suitable point in the circumference thereof. This construction permits the ends of the wire or cord to be twisted or tied after the ring is placed in position on the cylindrical end of one water main section so as to hold the deflated ring in position while the end of this section is inserted within the bell-shaped mouth of an adjoining section.

The novel device of my invention is used as follows. The continuous ring 6 is placed around the cylindrical small end of one section of a water main and this end is then inserted within the bell-shaped mouth of an adjoining section of the water main. After the smaller end of the first-mentioned section is inserted the full distance into the bell-shaped mouth of the adjoining section, the inflatable ring is pushed inwardly as far as possible within the space provided by the overlapping ends of the two adjoining sections as shown in Fig. 1. A suitable extension device (not shown) is secured to the end of inflation valve 7 for connecting the valve to a supply of air and the ring is inflated with air to a pressure of say 25 lbs. per square inch, although lower pressure may be used with advantage. The relatively large area of contact between the surfaces of the ring and the surfaces of the two sections of the water main insure effective sealing of the joint against leakage during subsequent operations. This area of contact being large with respect to the area of the lateral edge against which water within the main will bear makes it possible to hold back a high pressure within the main with only a relatively low pressure in the inflatable ring. The extension device is then disconnected from valve 7, any moisture which may be present is removed from the inner surfaces of the joint, and the void left in the joint is filled with molten lead or some similar fusible material as indicated at 9 in Fig. 1. The protective covering 8 on ring 6 insures protection of the ring from the effect of the hot sealing material. The joint is permanently sealed as soon as the fusible material has completely hardened.

The split-type inflatable ring shown in Figs. 3 and 4 is adapted particularly for use in the repair of an existing water main and is placed in position by bending the ends of the ring away from one another so as to permit its encirclement of the smaller end of one water main section. The ring is then slid along this section to a point well within the joint provided by the overlapping ends of adjoining sections of the water main. When a split ring of the type shown in Fig. 4 is used the contour of the ring is complemented after the ring is inserted in the joint by introducing the inserts 15 adjacent both surfaces of the ring at the overlapping ends thereof. The ring may then be inflated and the joint permanently sealed with a suitable fusible material as described above.

The novel device of my invention greatly reduces the time required heretofore for the sealing of joints in a water main, or the like, where it is necessary permanently to seal the joint with fusible material. My novel packing device insures the absence of all moisture from the joint and will maintain the joint absolutely bone-dry during the sealing operation. Thus the hazards usually concomitant with such sealing operations are avoided and the resulting seal is not deleteriously effected by moisture present in the joint as has been common heretofore.

I claim:

1. A packing device for use in water mains and the like which comprises an annular inflatable ring, an inflation valve positioned in one lateral edge of the ring, and a flexible protective covering disposed on the same lateral edge of the ring adapted to prevent deterioration of the ring by the deleterious effect of a fused sealing material.

2. A packing device for use in water mains and the like which comprises an annular inflatable ring of substantially greater width than thickness, an inflation valve positioned in one lateral edge of the ring and disposed for the most part within said inflatable ring with only a limited portion of the valve extending exteriorly of said edge of the ring, and a flexible protective covering disposed on the same lateral edge of the ring adapted to prevent deterioration of the ring by the deleterious effect of a fused sealing material.

3. A packing device for use in water mains and the like which comprises an annular inflatable ring of substantially greater width than thickness and having overlapping ends, an inflation valve positioned in one lateral edge of the ring and disposed for the most part within said inflatable ring with only a limited portion of the valve extending exteriorly of said edge of the ring, and a protective covering disposed on the same lateral edge of the ring adapted to prevent deterioration of the ring by the deleterious effect of a fused sealing material.

4. In a packing device for use in water mains and the like, the combination which comprises an annular inflatable ring of substantially greater width than thickness and having overlapping sealed ends, an inflatable valve positioned in one lateral edge of the ring and disposed for the most part within said inflatable ring with only a limited portion of the valve extending exteriorly of said edge of the ring, and inserts positioned adjacent each of said overlapping ends adapted to provide substantially smooth continuous circular surfaces around the circumference interiorly and exteriorly of the ring.

5. In a packing device for use in water mains and the like, the combination which comprises an annular inflatable ring of substantially greater width than thickness and having overlapping sealed ends, an inflation valve positioned in one lateral edge of the ring and disposed for the most part within said inflatable ring with only a limited portion of the valve extending exteriorly of said edge of the ring, and inserts having a main body portion adapted to abut the overlapping ends of the ring and having a relatively thin fin adapted to rest upon the overlapping ends of the ring.

6. A packing device for use in water mains and the like which comprises an annular inflatable ring of substantially greater width than thickness and having a protective covering of flexible material disposed on one lateral edge thereof with an excess of the protective covering material adjacent the center outer portion of the edge of the ring bound so as to provide a loop extending circumferentially around the ring.

7. A packing device in accordance with claim 6 in which a tightening wire extends circumferentially around the ring within said loop.

8. The method of sealing water mains and the like between the overlapping ends of adjoining sections of the mains which comprises placing within the space provided by said overlapping ends an annular inflatable ring having an inflation valve positioned in one lateral edge of the ring, said valve being disposed for the most part within said inflatable ring with only a limited portion of the valve extending exteriorly of said edge of the ring, inflating the ring, and filling the void remaining between the overlapping ends with a fused sealing material covering and sealing the extending portion of the inflation valve.

9. The method of sealing water mains and the like between the overlapping ends of adjoining sections of the mains which comprises placing within the space provided by said overlapping ends an annular inflatable ring having an inflation valve positioned in one lateral edge of the ring and disposed for the most part within said inflatable ring with only a limited portion of the valve extending exteriorly of said edge of the ring, the ring having a protective covering disposed on the same lateral edge of the ring, inflating the ring, and filling the void remaining between the overlapping ends with a fused sealing material covering and sealing the extending portion of the inflation valve.

10. The method of sealing a joint in an existing water main and the like which comprises placing around one section of the water main an annular inflatable ring having sealed overlapping ends with an inflation valve positioned in one lateral edge of the annular ring and disposed for the most part within said inflatable ring with only a limited portion of the valve extending exteriorly of said edge of the ring, sliding the ring into a joint provided by the overlapping end of an adjoining section of the water main, inflating the ring, and filling the void remaining between the overlapping ends of the adjoining sections of the water main with a fused sealing material covering and sealing the extending portion of the inflation valve.

THOMAS S. MILLER.